United States Patent Office

3,094,548
Patented June 18, 1963

3,094,548
PHOSPHORO CARBAMOYL DISULFIDES
Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed Apr. 10, 1961, Ser. No. 101,675
3 Claims. (Cl. 260—461)

This invention relates to a new class of phosphorus containing pesticides and a process for utilizing the same.

In particular this invention relates to new compounds which contain a novel disulfide configuration which provides new and valuable characteristics. These new compounds have been found to be useful in the elimination and control of numerous insect pests as will be shown hereafter.

These new compounds are phosphoro carbamoyl disulfides which may be represented by the formula:

$$\begin{array}{c}R_1O\\ \phantom{R_1O}\diagdown\\ \phantom{R_1OO}P-S-S-\overset{X}{\overset{\|}{C}}R_3\\ \phantom{R_1O}\diagup\\ R_2O\end{array}$$

wherein $R_1$ and $R_2$ are the same or different alkyl radicals, and $R_3$ may be alkoxy, aryloxy, alkenoxy, dialkylamino, dialkenylamino, monoalkylamino or monoalkenylamino and X may be oxygen or sulfur. These compounds may be prepared according to the following general reaction:

$$\begin{array}{c}R_1O\\ \diagdown\\ \phantom{RO}P(O)SY\\ \diagup\\ R_2O\end{array} + MS\overset{X}{\overset{\|}{C}}R_3 \longrightarrow \begin{array}{c}R_1O\\ \diagdown\\ \phantom{RO}P(O)-S-S-\overset{X}{\overset{\|}{C}}R_3\\ \diagup\\ R_2O\end{array} + MY$$

wherein $R_1$, $R_2$, $R_3$, and X are as defined above, Y is a halogen, and M is an alkali metal.

Among the alkoxy radicals which we have found satisfactory are methoxy, ethoxy, isopropoxy, normal propoxy, butoxy, octoxy, decoxy and the like as well as alkoxy groups containing ether linkages such as ethoxyethoxy, ethoxybutoxy, etc., and unsaturated radicals such as allyloxy. Suitable aryloxy radicals include phenoxy, chlorophenoxy, nitrophenoxy, and the like. Suitable alkylamino radicals include dimethylamino, diethylamino, dipropylamino, dibutylamino, diallylamino, monomethylamino, monoethylamino, monopropylamino, monobutylamino, monoallylamino, and the like. Alkyl radicals suitable for the phosphorus ester portion of the molecule include methyl, ethyl, propyl, butyl, octyl, decyl, and the like as well as combinations resulting in mixed esters such as methyl ethyl, ethyl octyl, methyl butyl, ethyl propyl, etc.

These compounds may be prepared by reacting in an inert solvent substantially stoichiometric quantities of an O,O-dialkyl phosphorosulfenyl halide with an alkali metal xanthate. The reaction appears to proceed almost instantaneously at temperatures from 0° C. to room temperature. Due to the salt formation, however, it is best to stir the final mixture for a short time after the reactants are mixed in order to ensure complete reaction. The salt may then be removed by filtration, washing or other well-known means.

The following examples illustrate the compounds of our invention.

EXAMPLE 1

A mixture of 31.0 grams of diethyl phosphorosulfenyl chloride was slurried in 200 cc. of benzene with 24.0 grams of potassium ethyl xanthate for 2 hours. The crude reaction product was filtered and the filter cake then washed with 50 cc. of ether followed by two 75 cc. portions of water. The product and solvent were dried over $Na_2SO_4$ and concentrated by heating to 50° C. at a pressure of 1.0 mm. Hg. The crude product weighed 38.3 grams (85.5% yield) and had an index of refraction $N_D^{25}=1.5442$. A small quantity was distilled and found to have a boiling point of 145° C. at 1 mm. Hg. This product had an index of refraction $N_D^{25}=1.5520$ and analyzed as 10.3% P and 31.3% S compared to the theoretical values of 10.6 and 31.9 for $(C_2H_5O)_2P(O)S-S-C(S)-OC_2H_5$.

EXAMPLE 2

To a slurry of 32.3 grams of potassium dipropyl dithiocarbamate in 150 cc. of benzene was added 30.8 grams of diethylphosphorosulfenyl chloride over a 30 minute period at room temperature. The reaction mixture was stirred an additional two hours at room temperature, concentrated to a paste and added to 200 cc. of water. The water layer was then extracted with two 100 ml. portions of ether, the extracts dried over $Na_2SO_4$ and the ether removed by heating to 50° C. at 1 mm. The product (76% yield) had an index of refraction $N_D^{25}=1.5467$ and analyzed 8.6% P and 29.0% S compared to the theoretical 9.0% P and 28.2% S for $$(C_2H_5O)_2P(O)S-S-C(S)N(C_3H_7)_2$$

EXAMPLE 3

To a solution of 21.6 grams of N-(allyl)-O-(ethyl)-thiocarbamate in 200 cc. of ether was added 38.8 grams of diethylphosphorosulfenyl chloride over a 30 minute period at 20° C. The product was stirred for one additional hour at room temperature, the ether evaporated, and the product stabilized by evacuating to 1.0 mm. Hg at 50° C. The product weighed 43.0 grams (98% yield), had an index of refraction $N_D^{25}=1.5089$ and analyzed 10.5% P and 21.6% S compared to 10.8% P and 22.4% S theoretical for $$(C_2H_5O)_2P(O)S-S-C(O)NHC_3H_5$$

EXAMPLE 4

To a slurry of 28.2 grams of potassium isobutyl xanthate in 150 ml. of benzene was added 30.4 grams of diethylphosphorosulfenyl chloride at 10° C. over a 30 minute period. The reaction mixture was stirred for 30 more minutes at room temperature and then at 50° C. for 30 minutes. The crude product was cooled, filtered and washed with three 50 ml. portions of water. The benzene solution was dried over $Na_2SO_4$, the benzene removed, and the product stabilized to 60° C. at 1.5 mm. The product weighed 33.0 grams (77% yield) and had an index of refraction $N_D^{25}=1.5288$. It analyzed 9.6% P and 31.2% S compared with 9.75% P and 30.0% S theoretical for $$(C_2H_5O)_2P(O)S-S-C(S)OC_4H_9$$

EXAMPLE 5

In a manner similar to Example 4 potassium isopropyl xanthate was reacted to give a 75.5% yield of $$(C_2H_5O)_2P(O)-S-S-C(S)OC_3H_7$$

which had an index of refraction $N_D^{25}=1.5274$ and analyzed 10.6% P and 31.9% S compared with theoretical values of 10.2% P and 31.5% S.

EXAMPLE 6

In a manner similar to Example 4 potassium decyl xanthate was reacted to give a 77.0% yield of $$(C_2H_5O)_2P(O)-S-S-C(S)OC_{10}H_{21}$$

which had an index of refraction $N_D^{25}=1.5120$ and analyzed as 8.0% P and 24.7% S compared to 7.7% P and 23.9% S theoretical.

EXAMPLE 7

To a suspension of 25.6 grams of sodium diethyl dithiocarbamate in 100 cc. of benzene was added 31.0 grams of diethylphosphorosulfenyl chloride at 20° C. over a one hour period. The reaction mixture was filtered to remove the benzene, the filter cake washed with 50 cc. of benzene, and the combined benzene solutions evaporated and then stabilized at 50° C. at 1.0 mm. The product weighed 39.0 grams (85% yield), had an index of refraction $N_D^{25}=1.5448$ and analyzed as 10.0% P and 27.1% S compared to 9.8% P and 30.3% S theoretical for $(C_2H_5O)_2P(O)S—S—C(S)N(C_2H_5)_2$.

EXAMPLE 8

In a manner similar to Example 7, 34.2 grams of sodium diethyl dithiocarbamate were reacted with 34.5 grams of dimethylphosphorosulfenyl chloride. The resulting product weighed 40.3 grams, had an index of refraction $N_D^{25}=1.6200$ and analyzed as 10.6% P and 32.3% S compared to 10.7% P and 33.2% S theoretical for $(CH_3O)_2P(O)S—S—C(S)N(C_2H_5)_2$.

EXAMPLE 9

In a manner similar to Example 1, 32.0 grams of potassium ethyl xanthate were reacted with 34.5 grams of dimethylphosphorosulfenyl chloride to give 40.5 grams (72% yield) of $(CH_3O)_2P(O)S—S—C(S)OC_2H_5$ analyzing 10.8% P and 35.5% S.

EXAMPLE 10

To a slurry of 34.8 grams of potassium butoxyethyl xanthate in 150 ml. of benzene was added 30.2 grams of diethylphosphorosulfenyl chloride over a 30 minute period at 10° C. The reaction mixture was allowed to warm up to room temperature and then stirred for one hour. The product was recovered as in the previous example to give 47.0 grams (70% yield) of

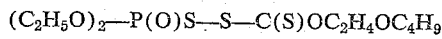

$(C_2H_5O)_2—P(O)S—S—C(S)OC_2H_4OC_4H_9$ which had an index of refraction $N_D^{25}=1.5226$.

EXAMPLE 11

In a manner similar to Example 1, 37.3 grams of dioctylphosphorosulfenyl chloride was reacted with 16.0 grams of potassium ethyl xanthate to give 38.0 grams (84% yield) of product having an index of refraction $N_D^{25}=1.4981$. It analyzed as 6.73% P and 18.7% S compared with 6.75% P and 20.9% S theoretical for $(C_8H_{17}O)_2P(O)S—S—C(S)OC_2H_5$.

EXAMPLE 12

In a manner similar to Example 7, 37.3 grams of dioctylphosphorosulfenyl chloride was reacted with 17.1 grams of sodium diethyldithiocarbamate to give 39.0 grams (82.2% yield) of product having an index of refraction $N_D^{25}=1.5085$. It analyzed as 7.05% P and 18.9% S compared with 6.4% P and 19.8% S theoretical for $(C_8H_{17}O)_2P(O)S—S—C(S)N(C_2H_5)_2$.

EXAMPLE 13

In a manner similar to Example 1, 12.0 grams of potassium ethyl xanthate was reacted with 21.6 grams of O-octyl, O-ethyl phosphorosulfenyl chloride to give 24.9 grams (89% yield) of crude

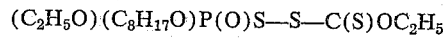

$(C_2H_5O)(C_8H_{17}O)P(O)S—S—C(S)OC_2H_5$ having an index of refraction $N_D^{25}=1.5072$.

EXAMPLE 14

In a manner similar to Example 7, 13.0 grams of sodium diethyldithiocarbamate and 21.6 grams of O-ethyl-O-octyl phosphorosulfenyl chloride were reacted to give 30.0 grams (100% yield) of crude

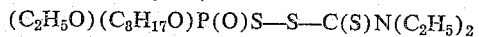

$(C_2H_5O)(C_8H_{17}O)P(O)S—S—C(S)N(C_2H_5)_2$ having an index of refraction $N_D^{25}=1.5155$.

EXAMPLE 15

To a slurry of 20.8 grams of potassium phenyl xanthate in 150 cc. of benzene, was added 20.4 grams of diethylphosphorosulfenyl chloride over a 30 minute period at room temperature. The reaction mixture was stirred two hours at room temperature, washed with 100 cc. of water, and then washed with two 50 cc. portions of saturated sodium bicarbonate solution. The benzene solution was dried over $Na_2SO_4$, the benzene removed under partial pressure, and the product stabilized to 50° C. at 1.0 mm. The product,

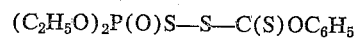

$(C_2H_5O)_2P(O)S—S—C(S)OC_6H_5$ (69.5% yield) had an index of refraction $N_D^{25}=1.5857$.

The class of compounds characterized by the foregoing examples has been found to have valuable pesticidal properties. In particular, these compounds are valuable in the control of common insect pests. By the term "insect" we do not intend to be limited to the narrow technical usage of this term to include only six-legged pests but intend the broader more common usage which includes spiders, mites, ticks, caterpillars, nematodes and the like.

In the following described tests demonstrating the utility of our new compounds four insect species representing four insect orders were used. These species are:

(1) American cockroach—*Periplaneta americana*—Orthopetra (designated AR)
(2) Confused flour beetle—*Tribolium confusum*—Coleoptera (designated CFB3)
(3) House fly—*Musca domestica*—Diptera (designated HF)
(4) Spotted milkweed bug—*Oncopeltus fasciatus*—Heteroptera (designated MWB)

In conducting the tests the compounds are made up into solutions, normally 0.1% concentration, using "wet water." The latter contains 2.5 grams of Vatsol and 1.0 gram of Methocel per twenty liters of water. Each solution is then sprayed onto the insects using a DeVilbiss hand sprayer in a fume hood. Mortality is reported after 72 hours as percent Kill/percent concentration.

The following results were obtained using the compounds of this invention.

*Table 1*

| Compound | Insect | | | |
|---|---|---|---|---|
| | HF | AR | MWB | CFB |
| Example 1 | 100/.01 | 80/.1 | 70/.1 | 100/.01 |
| Example 2 | 100/.01 | 60/.1 | 70/.06 | 100/.01 |
| Example 3 | 100/.0001 | 60/.01 | 70/.1 | 70/.0001 |
| Example 4 | 52/.1 | 0/.1 | 0/.1 | 0/.1 |
| Example 5 | 52/.1 | 0/.1 | 0/.1 | 0/.1 |
| Example 6 | 0/.1 | 0/.1 | 0/.1 | 0/.1 |
| Example 7 | 68/.005 | 100/.1 | 100/.1 | 100/.005 |
| Example 8 | 100/.1 | 0/.1 | 50/.1 | 0/.1 |
| Example 9 | 36/.1 | 0/.1 | 0/.1 | 0/.1 |
| Example 10 | 84/.1 | 0/.1 | 20/.1 | 0/.1 |
| Example 13 | 84/.1 | 20/.1 | 70/.1 | 0/.1 |
| Example 14 | 100/.1 | 40/.1 | 100/.1 | 0/.1 |

From these data it can be seen that these new compounds are valuable insecticides. Although the specific examples show the use of aqueous solutions of these compounds as insecticides, they may also be used in the form of emulsions, non-aqueous solutions, wettable powder, vapors, and dusts as may be best fitted to the conditions of use.

The concentration normally used for initial testing is a 0.1% solution. As noted above, however, many of these new compounds are effective pesticides at much lower levels, as low as 0.0001% in some instances. Since the effective concentration may vary with each compound and each pest to which it is applied, a general numerical range of concentrations cannot be stated. It is well within the skill of the art, however, to determine the effective concentration necessary to kill a significant proportion of a specific pest or combination of pests under certain conditions of application.

The foregoing description is given for clearness of understanding only and no unnecessary limitations should be understood therefrom as modifications will be obvious to those skilled in the art.

We claim:
1. The compound represented by the formula:

$(C_2H_5O)_2P(O)—S—S—C(S)OC_2H_4OC_4H_9$

2. The compound represented by the formula:

$(C_2H_5O)_2P(O)—S—S—C(S)OC_6H_5$

3. A compound having the formula:

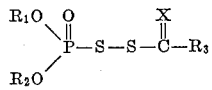

wherein $R_1$ and $R_2$ are alkyl radicals; $R_3$ is a member selected from the group consisting of phenoxy and alkoxyalkoxy; and X is a member selected from the group consisting of oxygen and sulfur.

References Cited in the file of this patent
UNITED STATES PATENTS
3,018,215    Pianka _____ Jan. 23, 1962